(12) United States Patent
Kumar et al.

(10) Patent No.: US 12,373,485 B2
(45) Date of Patent: Jul. 29, 2025

(54) IMAGE DATABASE ESTABLISHING METHOD, SEARCHING METHOD, ELECTRONIC DEVICE, AND STORAGE MEDIUM

(71) Applicant: Patsnap Limited, Suzhou (CN)

(72) Inventors: Pankaj Kumar, Jiangsu (CN); Hai Thien Nguyen, Jiangsu (CN); Markus Haense, Jiangsu (CN)

(73) Assignee: PATSNAP LIMITED, Suzhou (CN)

( * ) Notice: Subject to any disclaimer, the term of this patent is extended or adjusted under 35 U.S.C. 154(b) by 754 days.

(21) Appl. No.: 17/626,705

(22) PCT Filed: May 14, 2020

(86) PCT No.: PCT/CN2020/090141
§ 371 (c)(1),
(2) Date: Jun. 29, 2022

(87) PCT Pub. No.: WO2021/008213
PCT Pub. Date: Jan. 21, 2021

(65) Prior Publication Data
US 2022/0335081 A1    Oct. 20, 2022

(30) Foreign Application Priority Data
Jul. 12, 2019    (CN) .......................... 201910627827.8

(51) Int. Cl.
*G06F 16/583*    (2019.01)
*G06F 16/532*    (2019.01)
(Continued)

(52) U.S. Cl.
CPC ........ *G06F 16/5846* (2019.01); *G06F 16/532* (2019.01); *G06V 30/413* (2022.01)

(58) Field of Classification Search
CPC .... G06F 16/5846; G06F 16/532; G06F 16/53; G06F 16/58; G06V 30/413
See application file for complete search history.

(56) References Cited

U.S. PATENT DOCUMENTS

| 6,169,998 B1 | 1/2001 | Iwasaki et al. |
| 2004/0176915 A1 | 9/2004 | Williams et al. |

(Continued)

FOREIGN PATENT DOCUMENTS

| CN | 102541286 | 7/2012 |
| CN | 104376199 | 2/2015 |

(Continued)

OTHER PUBLICATIONS

International Search Report issued for International Patent Application No. PCT/CN2020/090141, Date of mailing: Aug. 13, 2020, 7 pages including English translation.

(Continued)

*Primary Examiner* — Iriana Cruz
(74) *Attorney, Agent, or Firm* — HSML P.C.

(57) ABSTRACT

An image database establishing method, a searching method, an electronic device and a storage medium. The method comprises: obtaining a target file which has target text information (S210); generating a target image corresponding to content expressed by the target text information based on the target text information (S220); and storing the target image to form an image database (S230). The above method solves the problem in the prior art that it is time-consuming and laborious to establish a database by manually filtering, analyzing and summarizing massive text files, and effectively improves the efficiency of establishing an image database.

13 Claims, 6 Drawing Sheets

| Branch structure mark | Text information | Position of text information |
|---|---|---|
| R1 | R1 is a substituted or unsubstituted C1-C6 alkyl, halogen, OH, C1-C12 alkoxy, optionally substituted phenoxy, or optionally substituted naphthoxy, wherein the optional substituents are C1-C6 alkyl and C1-C6 alkoxy | Page 1 |
| R2 | R2 may be combined to form a 5 to 7-membered heterocycle which is substituted by a member selected from hydrogen, alkyl with 1 to 8 carbon atoms and aryl with 3 to 7 carbon atoms, wherein the heterocyclic compound includes 1 to 2 nitrogen atoms and 0 to 1 oxygen atom, and the nitrogen atoms are not directly connected to each other or connected to the oxygen atom. | Page 10 |
| Quantifier | 1-8; 3-7; 1-2; 0-1 | Page 10 |

(51) Int. Cl.
*G06F 16/55* (2019.01)
*G06V 30/413* (2022.01)

(56) References Cited

U.S. PATENT DOCUMENTS

| | | | | |
|---|---|---|---|---|
| 2007/0016612 | A1* | 1/2007 | James | G16C 20/40 |
| 2008/0178120 | A1 | 7/2008 | Yamamoto | |
| 2011/0295893 | A1 | 12/2011 | Wu | |
| 2012/0141032 | A1* | 6/2012 | Ouyang | G06V 30/347 |
| | | | | 382/187 |
| 2013/0218878 | A1* | 8/2013 | Smith | G06V 30/422 |
| | | | | 707/723 |
| 2014/0205188 | A1 | 7/2014 | Ouyang et al. | |
| 2018/0114142 | A1 | 4/2018 | Mueller | |
| 2018/0293211 | A1* | 10/2018 | Pregasen | G06F 40/211 |
| 2019/0367530 | A1* | 12/2019 | Morales | A61P 29/00 |
| 2019/0377979 | A1 | 12/2019 | Jiang et al. | |

FOREIGN PATENT DOCUMENTS

| | | |
|---|---|---|
| CN | 105183737 | 12/2015 |
| CN | 108388551 A | 8/2018 |
| CN | 108470036 | 8/2018 |
| CN | 109697239 | 4/2019 |
| CN | 109766468 | 5/2019 |
| CN | 109815355 | 5/2019 |
| CN | 110413814 | 11/2019 |
| CN | 110599557 | 12/2019 |
| EP | 2657810 | 10/2013 |
| JP | H1125113 A | 1/1999 |
| JP | 2008146602 A | 6/2008 |
| JP | 2012053519 A | 3/2012 |
| JP | 2013246544 A | 12/2013 |
| JP | 2014092930 A | 5/2014 |

OTHER PUBLICATIONS

First Office Action and Search Report issued for Chinese Patent Application No. 201910627827.8, dated Jun. 25, 2021, 27 pages including English machine translation.
Second Office Action issued for Chinese Patent Application No. 201910627827.8, dated Dec. 7, 2021, 21 pages including English machine translation.
Notice of Reasons for Refusal issued for Japanese Patent Application No. 2022-502183, Dispatch Date: May 9, 2023, 8 pages including English machine translation.
Papadatos, G. et al., "SureChEMBL: a large-scale, chemically annotated patent document database," Nucleic Acids Research, 2016, vol. 44, Published online: Nov. 17, 2015, pp. D1220-D1228.
Extended European Search Report issued for European Patent Application No. 20841371.6, dated Mar. 29, 2023, 8 pages.
Communication pursuant to Article 94(3) EPC issued for European Patent Application No. 20841371.6, dated Oct. 30, 2024, 11 pages.

* cited by examiner

| Branch structure mark | Text information | Position of text information |
|---|---|---|
| R1 | R1 is a substituted or unsubstituted C1-C6 alkyl, halogen, OH, C1-C12 alkoxy, optionally substituted phenoxy, or optionally substituted naphthoxy, wherein the optional substituents are C1-C6 alkyl and C1-C6 alkoxy | Page 1 |
| R2 | R2 may be combined to form a 5 to 7-membered heterocycle which is substituted by a member selected from hydrogen, alkyl with 1 to 8 carbon atoms and aryl with 3 to 7 carbon atoms, wherein the heterocyclic compound includes 1 to 2 nitrogen atoms and 0 to 1 oxygen atom, and the nitrogen atoms are not directly connected to each other or connected to the oxygen atom. | Page 10 |
| Quantifier | 1-8; 3-7; 1-2; 0-1 | Page 10 |

IMAGE DATABASE ESTABLISHING METHOD, SEARCHING METHOD, ELECTRONIC DEVICE, AND STORAGE MEDIUM

This application is a National Stage of International Application No. PCT/CN2020/090141, filed on May 14, 2020, which claims priority to Chinese patent application NO. 201910627827.8, entitled "image database establishing method, searching method, electronic device, and storage medium" and filed on Jul. 12, 2019, both of which are hereby incorporated by reference in their entireties.

TECHNICAL FIELD

The embodiments of the present disclosure relate to a technical field of computers, and particularly, to an image database establishing method, a searching method, an electronic device and a storage medium.

BACKGROUND

With the application and development of Internet technologies, people are more and more accustomed to search for information on the Internet. For the search of image information, a user usually enters an interested image in a search engine of a website providing a search service, and then the website matches the image with a database. If the matching is successful, information related to the image can be displayed to the user for a browse.

To this end, the prior arts have provided many databases of image information, which are generally established based on existed image files. However, in an actual file system, not only an image file can include images, but also a text file may have image descriptions. Therefore, when image information in text files is added to a database, it is necessary to manually filter, analyze and summarize the text files and draw images. It will take intensive labors and man-hours for a large number of text files.

At present, there is no effective solution to the above problem.

SUMMARY

An objective of the embodiments of the present disclosure is to provide an image database establishing method, a searching method, an electronic device and a storage medium, so as to improve the efficiency of establishing an image database.

In order to solve the above problem, the embodiments of the present disclosure provide an image database establishing method, a searching method, an electronic device and a storage medium.

An image database establishing method, comprising: obtaining a target file which has target text information; generating a target image corresponding to content expressed by the target text information based on the target text information; and storing the target image to form an image database.

In one embodiment, obtaining the target file comprises: downloading files from a data source to form a file set; and obtaining a target file from the file set according to a preset condition.

In one embodiment, the preset condition comprises: determining a file type of the files in the file set; determining a filtering rule of a corresponding target file in accordance with the file type, wherein different file types correspond to different filtering rules, and wherein the filtering rule is adopted to filter files of a corresponding file type to obtain a target file.

In one embodiment, determining the file type of the files in the file set comprises: performing a text recognition on the files in the file set to obtain text information included in the files; and determining the file type of the files in the file set based on a preset keyword included in the text information.

In one embodiment, the file type of the files in the file set comprise at least one of a patent document and a non-patent document.

In one embodiment, the non-patent document comprises at least one of a trademark document, a contract document and an academic thesis.

In one embodiment, the method further comprises performing a text recognition on the target file to obtain the target text information.

In one embodiment, the target text information expresses a chemical structure, and the corresponding target image comprises a chemical structure formula corresponding to the content expressed by the target text information.

In one embodiment, the target image corresponding to the content expressed by the target text information comprises a main structure and at least one branch structure associated with the main structure.

In one embodiment, the main structure comprises a main part of a Markush structure, and the branch structure comprises a substituent part of the Markush structure.

In one embodiment, generating the target image corresponding to content expressed by the target text information based on the target text information comprises: generating, if a chemical structure expressed by the target text information does not comprise a Markush structure, the target image corresponding to the content expressed by the target text information, wherein the target image comprises a chemical structural formula of the chemical structure.

In one embodiment, generating the target image corresponding to content expressed by the target text information based on the target text information comprises: determining, if the target file comprises an image file and a corresponding text file, an image in the image file corresponding to the target text information of the text file; and taking the image corresponding to the target text information as the target image.

In one embodiment, the target text information comprises main information expressing a main structure of a chemical structure; and generating the target image corresponding to content expressed by the target text information based on the target text information comprises: determining a main structure comprised in the target image based on the main information in the target text information.

In one embodiment, the target text information further comprises: branch information expressing a branch structure of the chemical structure; and generating the target image corresponding to content expressed by the target text information based on the target text information further comprises: adding a branch structure to the main structure of the target image based on the branch information in the target text information.

In one embodiment, storing the target image to form the image database comprises: storing the main structure and the branch structure of the target image in correspondence.

In one embodiment, the target file is a picture file; and generating the target image corresponding to content expressed by the target text information based on the target text information comprises: performing an image recognition on the picture file to determine the target text information in the picture file; and generating the target image corresponding to the target text information based on the target text information, wherein the target image comprises a chemical structural formula of a chemical structure expressed by the target text information.

In one embodiment, the target file comprises image information and text information; the method further comprises: determining target text information in the text information, wherein the target text information expresses a chemical structure; determining whether images comprised in the image information comprise the target image corresponding to the target text information, wherein the target image comprises a chemical structural formula of the chemical structure expressed by the target text information; and generating the target image expressed by the target text information based on the target text information, if there is no target image corresponding to the target text information in the images comprised in the image information.

In one embodiment, storing the target image to form an image database further comprises: storing the target file and the target image in association.

The embodiments of the present disclosure further provide a searching method, comprising: obtaining an image to be matched; determining whether an image matched with the image to be matched is existed in a pre-established image database, wherein the pre-established image database is established by extracting text information and image information from a sample file and based on images generated in accordance with the text information and the image information; and displaying the matched image if it is determined that the matched image is existed in the pre-established image database.

In one embodiment, displaying the matched image if it is determined that the matched image is existed in the pre-established image database further comprises: displaying text information associated with the matched image.

In one embodiment, after displaying the matched image and the text information associated with the matched image, the method further comprises: receiving a user's viewing trigger operation; and displaying the text information associated with the matched image in a preset display mode in response to the viewing trigger operation.

In one embodiment, the preset display mode comprises at least one of highlighting, bolding and circling.

In one embodiment, the image to be matched comprises a main structure and at least one branch structure associated with the main structure.

In one embodiment, the image to be matched is a chemical structural formula.

The embodiments of the present disclosure further provide an electronic device, comprising: an input device configured to obtain an image to be matched; a processor configured to determine whether an image matched with the image to be matched is existed in a pre-established image database, wherein the pre-established image database is established by extracting text information and image information from a sample file and based on images generated in accordance with the text information and the image information; and a display device configured to display the matched image, if it is determined that the matched image is existed in the pre-established image database.

The embodiments of the present disclosure further provide an electronic device, comprising: a network communication unit configured to obtain a target file which has target text information; a processor configured to generate a target image corresponding to content expressed by the target text information based on the target text information; and a memory configured to store the target image into an image database.

The embodiments of the present disclosure further provide a computer-readable storage medium storing computer program instructions executed to: obtain a target file which has target text information; generate a target image corresponding to content expressed by the target text information based on the target text information; and store the target image to form an image database.

The embodiments of the present disclosure further provide a computer-readable storage medium storing computer program instructions executed to: obtain an image to be matched; determine whether an image matched with the image to be matched is existed in a pre-established image database, wherein the pre-established image database is established by extracting text information and image information from a sample file and based on images generated in accordance with the text information and the image information; and display the matched image, if it is determined that the matched image is existed in the pre-established image database.

In the image database establishing method provided by the embodiments of the present disclosure, target text information in a target file may be obtained, and a target image may be generated based on the target text information, then the target image may be stored to form an image database. Further, if the target file includes image information, the target image may be generated based on an association between content expressed by the target text information and the image information, and then the target image may be stored to form an image database. The process of forming the image database in the embodiments of the present disclosure may be executed by a computer, without manually filtering, analyzing or summarizing the text files, thereby effectively improving the efficiency of establishing the image database.

BRIEF DESCRIPTION OF DRAWINGS

For clearer illustration of the embodiments in the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts.

DESCRIPTION OF EMBODIMENTS

A clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

In this embodiment, a subject that executes the image database establishing method may be an electronic device with a logic operation function which may be a server or a client, and the client may be a desktop computer, a tablet computer, a notebook computer, a workstation, etc. Of course, the client is not limited to the above electronic devices with certain entities, and may also be software runnable in those electronic devices. The client may also be a program software formed through a program development and runnable in the above electronic devices.

The image databases in the prior art are generally established just based on image files. Considering that there may be image descriptions in text information, if the text information can be converted into images as resources of a database, the quantity of search resources in the database can be effectively increased, thereby effectively improving the coverage of a final search structure and the search efficiency.

Figure 1:
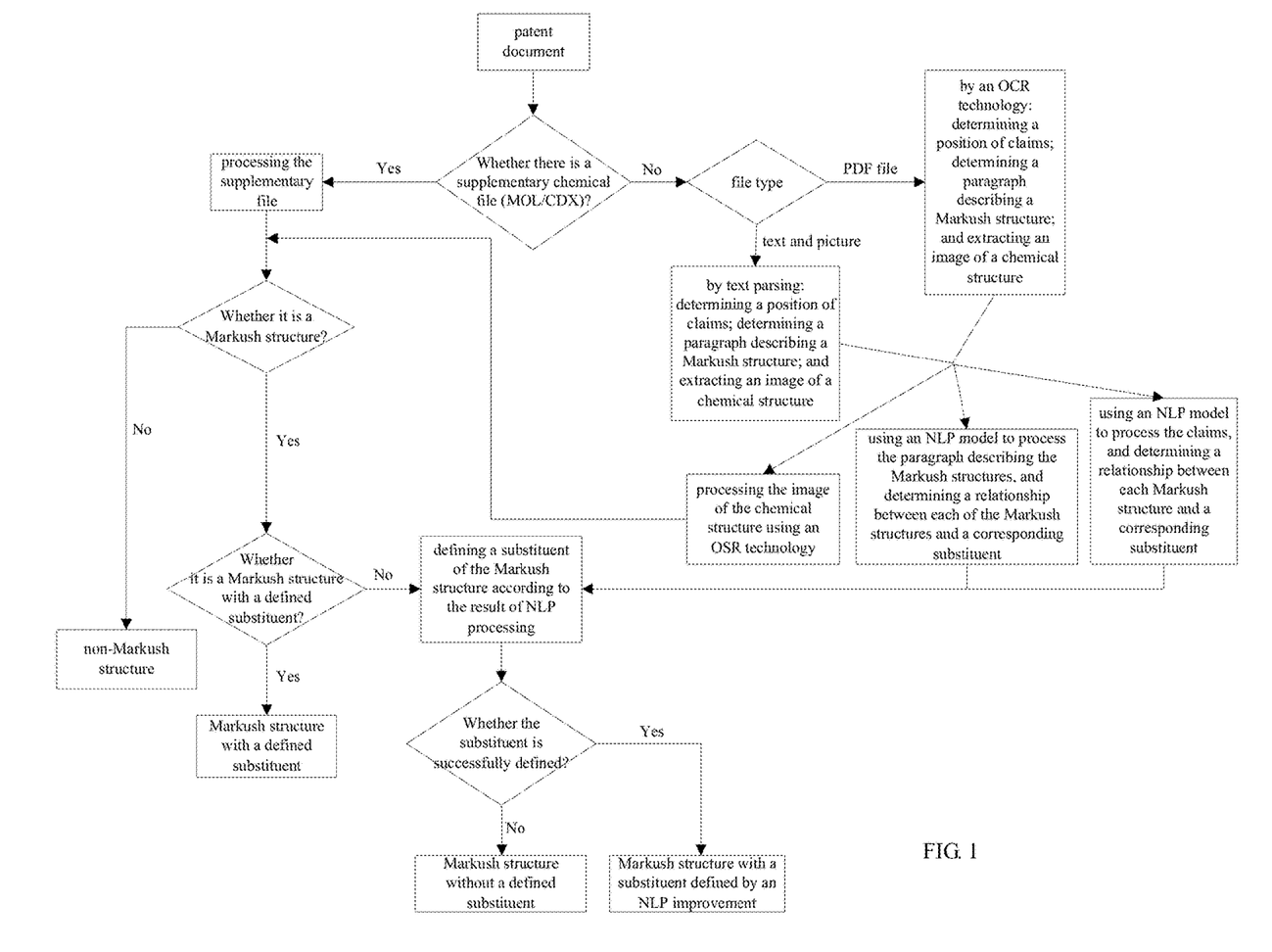
FIG. 1 is a method flowchart of a scenario example according to an embodiment of the present disclosure.

This embodiment provides a scenario example, as illustrated in FIG. 1, which is a flowchart of a scenario example according to this embodiment.

In this scenario example, a Markush structure is taken as a target image to establish an image database. A Markush claim is a special issue involved in unity of chemical invention patent applications, and it is a claim with a plurality of 'functionally equivalent' chemical components in a compound of one or more parts. A chemical structure in a patent document is usually protected by the Markush structure. According to a definition of a chemical structure substituent in a patent document, a single Markush structure can possibly protect a plurality of compounds.

In this scenario example, a patent document is taken as a target file, and the patent document may be a file that simultaneously includes text data such as Claims and Description, and drawing data such as Drawings and Figure Accompanying the Abstract. Wherein, the patent document may be a Chinese patent document such as a file in a format of PDF, or a foreign patent document such as a US patent document or a European patent document. If the patent document is a US patent document, the US Patent and Trademark Office further provides additional image files in a format of TIFF for an XML patent document, and in case of chemical images, corresponding chemical structure files in formats of MOL and CDX are also provided.

Firstly, a server may obtain a patent document and determine whether the patent document include any supplementary file, such as a supplementary file in a format of MOL or CDX for a corresponding chemical structure. If so, the server may perform a procession on the supplementary file, and determine whether a chemical structure in the supplementary file is a Markush structure. For example, a file in the format of CDX may be processed with software such as Jchem to analyze atoms, super atoms and other information in the chemical structure, so as to determine whether the chemical structure in the file is a Markush structure. In case of a non-Markush structure, a chemical structural formula thereof is stored in the database. In case of a Markush structure, it is possible to further determine whether a substituent of the Markush structure has been defined, and if so, store a chemical structural formula of the Markush structure with a defined substituent in the database.

In case of a patent document that does not include any supplementary file, determining a file type of the patent document, and obtaining the position of Claims in the patent document and a paragraph describing a chemical structure and a Markush structure by using different processing methods based on different file types, and extracting an image of a chemical structural formula in the patent document. For example, if the patent document is a picture file in a format of pdf, jpg or png, text information and image information therein can be extracted by an Optical Character Recognition (OCR) technology, and if the patent document is a text file in a format of XML or HTML, the text file is converted into a file recognizable by the server to extract the text information and the image information.

After the position of the Claims in the patent document and the paragraph describing the chemical structure and the Markush structure are obtained, and the image of the chemical structural formula in the patent document is extracted, it is possible to extract the image of the chemical structural formula in an image file by an Optical Structure Recognition (OSR) technology, determine whether the chemical structure is a Markush structure, further determine whether a substituent of the Markush structure has been defined, and then store the non-Markush structure and the Markush structure with a defined substituent.

In this scenario example, it is possible to semantically analyze the Claims and the paragraph describing the chemical structure and the Markush structure by a Natural Language Processing (NLP) technology, so as to obtain a relationship between the Markush structure and a corresponding substituent in the chemical structure. In the above step of determining whether a substituent of the Markush structure has been defined, the Markush structure without a defined substituent is processed according to the relationship between the Markush structure and the corresponding substituent obtained by the natural language processing, to determine whether the substituent of the Markush structure without a defined substituent can be defined; if the result of the determination is yes, the Markush structure is output with the substituent defined by an NLP improvement, and the chemical structural formula of the Markush structure is stored in the database; while if the result of the determination is no, the Markush structure is output without a defined substituent, and the chemical structural formula of the Markush structure is stored in the database.

Figure 2:
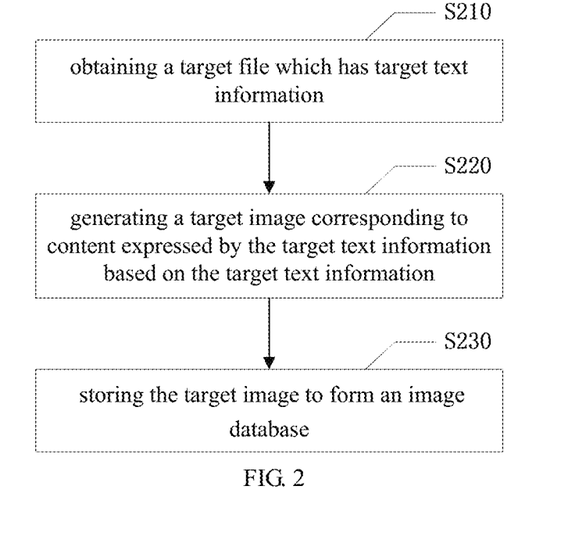
FIG. 2 is a flowchart of an image database establishing method according to an embodiment of the present disclosure.

To this end, an embodiment of the present disclosure provides an image database establishing method used in an electronic device with a logic operation function. As illustrated in FIG. 2, the method may comprise the following steps.

S210: obtaining a target file which has target text information.

The target file may be specifically understood as a text file, or a file including a text file and a corresponding image file, such as a text file in a format of XML or HTML and an image file in a format of MOL or CDX. Wherein, the text file may comprise text information textually describing an image structure, or both the text information textually describing the image structure and image information of the image file, while the image file may comprise the image information of the image structure.

In some embodiments, the target file may also be a picture file in a format of pdf, jpg or png for example, wherein the picture file may comprise text information textually describing an image structure, or both the text information textually describing the image structure and image information of the image structure.

In some embodiments, the target file may also be a patent document, e.g., a patent application document simultaneously including text information such as Claims and Description, and image information such as Drawings and Figure Accompanying the Abstract. The target file may also be a trademark document, a contract document with drawings, etc.

In some embodiments, the target file may also be a periodical, a magazine, a thesis, etc. Specifically, the target file may be a Chinese periodical, magazine or thesis included in a general journal, a provincial periodical, a core periodical, etc.; or a periodical, magazine or thesis included in a foreign journal, such as Science Citation Index (SCI), Science, etc. The periodical, magazine or thesis can simultaneously include text information such as an abstract, a discussion, a test and a conclusion, as well as image information such as drawings. During specific implementations, the target file may also be other types of files including text files and image files according to specific application scenarios, besides those listed above. The specific type and content of the target file are not limited herein.

The target text information may be text information including a preset keyword, and in some embodiments, a text recognition may be performed on the target file to obtain the target text information. Specifically, for a text file in a format of XML or HTML, the target text information may be obtained by recognizing whether the text file includes text information having a preset keyword. For an image file in a format of pdf, jpg or png, text data may be obtained by an Optical Character Recognition (OCR) technology, thereby obtaining the target text information by recognizing whether the text data includes text information having a preset keyword.

In some embodiments, the target file may be obtained by the following steps:

Step 1: downloading files from a data source to form a file set.

The data source refers to a database allowing a file download, and specifically may comprise databases including Chinese and foreign files, such as Baidu Library, Wanfang Data, China National Knowledge Infrastructure, a website of the China National Intellectual Property Administration as well as foreign language databases, websites of intellectual property offices of other countries, etc. Downloading files from the data source may refer to downloading files with specified a name or keyword, or broadly downloading files from the data source and then forming a file set using the downloaded file.

Step 2: obtaining a target file from the file set according to a preset condition.

In some embodiments, the preset condition comprises: determining a file type of the files in the file set; determining a filtering rule of a corresponding target file in accordance with the file type, wherein different file types correspond to different filtering rules. Wherein, the filtering rule is adopted to filter files of a corresponding file type to obtain the target file. Specifically, the file types of the files in the file set may comprise a patent document and a non-patent document, and further, the non-patent document may also be a trademark document, a contract document or an academic thesis.

In some embodiments, after the files are downloaded from the data source to form the file set, the type of the files in the file set may be determined by performing a text recognition on the files in the file set to obtain text information included in the file, and determining the file type of the files in the file set based on a preset keyword included in the text information. Specifically, it is possible to determine whether a file in the file set is a Chinese file or a foreign file based on a language of the text information, and it is also possible to determine whether a file in the file set is a patent document or a non-patent document based on a preset keyword included in the text information. For example, if the text information included in the file includes preset keywords such as claims, drawings, background, embodiments, etc., it may be determined that the file type of the file is a patent document. If the file includes preset keywords such as trademark application description, drawings, trademark description, commodity/service item, etc., it may be determined that the file type of the file is a trademark document. If the file includes preset keywords such as Party A, Party B, main terms of the contract, contract conclusion time, liability for breach of contract, etc., it may be determined that the file type of the file is a contract document. If the file includes preset keywords such as abstract, summary, conclusion, reference literature, etc., it may be determined that the file type of the file is an academic thesis. Other types of files can also be distinguished by the method of this embodiment, which will not be described herein. The file types of foreign files may be distinguished with reference to the method for Chinese files.

In some embodiments, after the file types are determined, a filtering rule of a corresponding target file may be determined in accordance with the file type, so as to obtain the target file from the file set. Specifically, if the file type is a patent document, a field of the patent document may be determined based on a patent classification number, and a patent document in the specified field may be filtered out as the target file. Wherein, the field of the patent document may comprise chemistry, electricity, machinery, physics, etc. Further, categories of the patents in different fields may be further refined. For example, patents in the field of chemistry may be further refined into those in the categories of organic chemistry, inorganic chemistry and biochemistry, and patents in the field of electricity may be further refined into those in the categories of basic electronic circuits and telecommunication technologies.

In some embodiments, for patent documents of different countries, different kinds of patent classification numbers may be adopted to determine the fields of the patent documents. For example, international patent classification numbers may be adopted to determine the field of a Chinese patent, European patent classification numbers may be adopted to determine the field of a European patent, and US patent classification numbers may be adopted to determine the field of a US patent. During specific implementations of this embodiment, it is possible to determine the country of a patent document based on the patent application publication number or authorization announcement number thereof, and then the fields of the patent documents of different countries may be determined based on corresponding patent classification numbers.

In some embodiments, if the file type is a non-patent document, a text recognition is performed on the file to obtain text information therein, and a file having text information including a preset keyword is filtered out as the target file.

S220: generating a target image corresponding to content expressed by the target text information based on the target text information.

Figure 3:
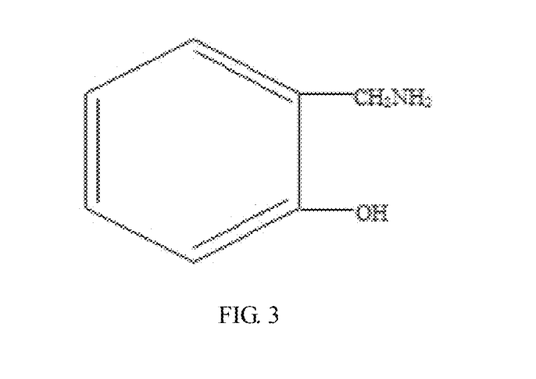
FIG. 3 is a schematic diagram of a chemical structural formula according to an embodiment of the present disclosure.

In some embodiments, the content expressed by the target text information may be a text description of a chemical structure, wherein the chemical structure reflects an order of atoms of various elements in a substance molecule, i.e., a connection mode and a sequence of the atoms. For example, if the target text information is 'the compound is substituted toluene, in which one hydrogen atom in a methyl is substituted by an amidogen, and a hydrogen atom in the ortho-position of the toluene is substituted by a hydroxyl', the content expressed by the target text information is a text description of a chemical structure of a certain compound. Correspondingly, the target image comprises a chemical structural formula corresponding to the content expressed by the target text information. Wherein, the chemical structural formula is a chemical composition formula which indicates an arrangement and a combination of atoms in a compound (or a simple substance) molecule using an element symbol and a short line, and it is a method to simply describe a molecular structure. For example, if the target text information is 'the compound is a substituted toluene, in which one hydrogen atom in a methyl is substituted by an amidogen, and a hydrogen atom in the ortho-position of the toluene is substituted by a hydroxyl', the corresponding target image may be the chemical structural formula illustrated in FIG. 3.

Figure 4:
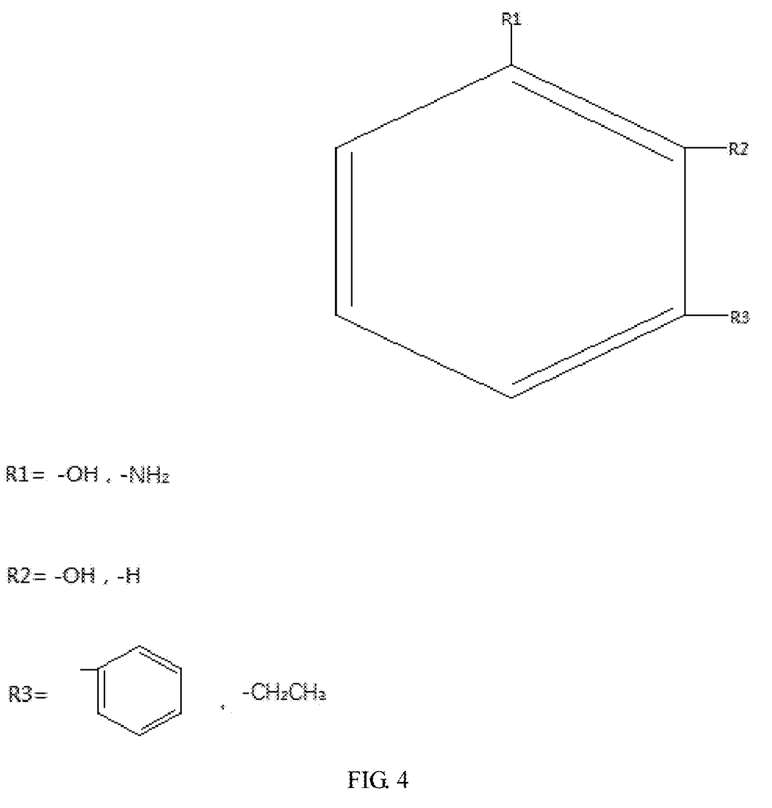
FIG. 4 is a structural diagram of a Markush structure according to an embodiment of the present disclosure.

In some embodiments, the target image corresponding to the content expressed by the target text information comprises a main structure and at least one branch structure associated with the main structure. Further, the target image may also be a Markush structure as illustrated in FIG. 4. Correspondingly, the main structure comprises a main part of the Markush structure (an upper part of FIG. 4), and the branch structure comprises a substituent part of the Markush structure (a lower part of FIG. 4).

In some embodiments, the generation of the target image may be realized according to the meaning of the content expressed by the target text information. For example, each keyword in the target text information corresponds to an image element, and the image elements corresponding to the keywords are combined in a certain arrangement mode based on the keywords and other description information in the text information, so as to generate the target image. For another example, a drawing program may be adopted to generate the target image by drawing the content expressed by the target text information. For instance, if 'toluene' appears in the target text information, the drawing program will draw a chemical structural formula of the toluene; if a connection relation 'the ortho position and the para position of the methyl on the toluene are substituted by one hydroxyl and one carboxyl, respectively" also appears in the target text information, the drawing program will draw chemical structural formulas of the one hydroxyl and the one carboxyl at the ortho position and the para position of the methyl on the toluene, respectively. In addition, the meaning of the content expressed by the target text information may be extracted in any way to generate the target image.

In some embodiments, generating the target image corresponding to content expressed by the target text information based on the target text information may comprise: generating, if a chemical structure expressed by the target text information comprises a Markush structure, an image corresponding to the Markush structure based on the content expressed by the target text information; and further, generating, if the content expressed by the target text information comprises a substituent of a Markush structure, an image corresponding to the substituent of the Markush structure. In the image generation process, based on the content expressed by the target text information, the generated image corresponding to the main part of the Markush structure and the generated image corresponding to the substituent part of the Markush structure may be combined as the target image.

In some embodiments, generating the target image corresponding to content expressed by the target text information based on the target text information may comprise: generating, if the chemical structure expressed by the target text information does not comprise a Markush structure, the target image corresponding to the content expressed by the target text information, wherein the target image comprises a chemical structural formula of the chemical structure. Specifically, it may be determined, based on the target text information, whether the chemical structure expressed by the target text information comprises a Markush structure, and if it is determined that the chemical structure comprises a Markush structure, a corresponding chemical structural formula is generated.

In some embodiments, generating the target image corresponding to content expressed by the target text information based on the target text information may comprise: determining, if the target file comprises an image file and a corresponding text file, an image in the image file corresponding to the target text information of the text file; and taking the image corresponding to the target text information as the target image. Specifically, if the target file comprises an image file and a corresponding text file, an image in the image file corresponding to the target file information of the text file is determined, and the corresponding image is taken as the target image.

In some embodiments, if the chemical structure comprises a main structure and at least one branch structure, the target text information may comprise main information expressing the main structure of the chemical structure, and may also comprise branch information expressing the branch structure of the chemical structure. Therefore, in this embodiment, the main structure comprised in the target image may be determined based on the main information in the target text information, and the branch structure may be added to the main structure of the target image based on the branch information in the target text information.

In some embodiments, if the target file is a picture file, image recognition may be performed on the picture file. For example, text data included in the picture file may be obtained by an OCR technology, so as to determine whether the text data includes target text information, and generate a target image corresponding to the target text information based on the target text information; wherein the target image comprises a chemical structural formula of the chemical structure expressed by the target text information.

In some embodiments, if the target file comprises image information and text information, it may be determined whether the target text information is included in the text information, and further, it may be determined whether an image in the image information includes the target image corresponding to the target text information. Wherein, an image in a file including image information may be extracted by an Optical Structure Recognition (OSR) technology, and an image may be extracted by computer software, such as software Jchem, for a file including image information in a specific format such as MOL or CDX. If there is no target image corresponding to the target text information in the images included in the image information, a target image expressed by the target text information is generated based on the target text information.

In some embodiments, generating the target image corresponding to content expressed by the target text information based on the target text information may be realized by a Natural Language Processing (NLP) technology. Specifically, a natural language model may be trained, and the target text information is semantically analyzed by inputting the target text information into a natural language model, so as to convert the content expressed in the target text information into a corresponding target image. Wherein, the natural language model may be trained by taking a large number of target text information as training samples in advance, and training, by a machine learning method, a natural language model capable of recognizing meanings of different phrases in the text information and recognizing association relationships between a plurality of phrases. During the training of the natural language model, the target text information may firstly be labeled manually in the training samples. For example, the following training samples are adopted:

Example 1: the composition of claim 1, wherein (B) is an alkenyl succinimide including at least about 30 aliphatic carbon atoms in the alkenyl.

In this training sample, different descriptions and relationships therebetween may be labeled. For example, 'alkenyl', 'aliphatic carbon atom' and 'alkenyl succinimide' may be labeled as Markush enumerations; a numeral in the description, such as '30' mentioned above, is a quantifier and may be labeled as Quantifier; for names of groups such as 'alkenyl' and 'alkenyl succinimide', since the name 'alkenyl' is a part of the name 'alkenyl succinimide', the label may be Part Of; according to a positional relationship, such as 'an alkenyl succinimide including at least about 30 aliphatic carbon atoms in the alkenyl' mentioned above, a positional association between the aliphatic carbon atoms and the alkenyl may be labeled as Position. Similarly, the descriptions such as "in . . . ", 'combined with . . . ', "at . . . ", "belong to . . . " all can be labeled in the above way.

Example 2: R1 is selected from hydrogen and a sulfhydryl-protecting group on a cysteine residue.

In this training sample, R1 may be labeled as a Markush mark; a positional association between the cysteine residue and the sulfhydryl-protecting group is labeled according to a positional relationship; 'hydrogen', 'cysteine residue', 'sulfhydryl-protecting group' and 'protecting group' are all labeled as Markush enumerations; and according to a substitution relationship, the R1 may be substituted by hydrogen and a protecting group, and the protecting group may be substituted by the sulfhydryl, which can be labeled as Value_Replacement. Similarly, the description of 'selected from', 'substitute', 'represent', 'include', 'wherein' and the like may be labeled in the above way.

Example 3: R4 is selected from hydrogen and a heterocycle, wherein the heterocycle has at least one carbon atom and 1 to 4 heteroatoms selected from oxygen, nitrogen and sulfur, and the heterocycle may be substituted by any of the following: heteroaryl amino, N-aryl-N-alkylamino, N-heteroarylamino-N-alkylamino, haloalkylthio, alkanoyloxy, alkoxy, heteroaralkoxy, cycloalkoxy, cycloalkenyloxy, hydroxy, amino, thio, nitro and lower alkylamino.

In this training sample, attribute relationship may also be labeled in addition to a Markush mark, a Markush enumeration, position information, a quantifier, a substitution relationship and a name. For example, in the above description 'wherein the heterocycle has at least one carbon atom and 1 to 4 heteroatoms selected from oxygen, nitrogen and sulfur', the heteroatom is an essential feature of the heterocycle, so it may be labeled that the heteroatom is an attribute of the heterocycle, and the label may be Attribute.

Example 4: R1 is a substituted or unsubstituted C1-C6 alkyl, halogen, OH, C1-C12 alkoxy, optionally substituted phenoxy, or optionally substituted naphthoxy, wherein the optional substituents are C1-C6 alkyl and C1-C6 alkoxy.

In this training sample, in addition to the labels expressed above, a reference name may also be labeled, for example, regarding the above description 'optionally substituted phenoxy' and 'optionally substituted naphthoxy', the label is Reference, which is a non-specific name that includes names of a set. Similarly, the label may be Reference for the descriptions of residue, substituent, acid and the like.

Example 5: R1 and R2 may be combined to form a 5 to 7-membered heterocycle which is substituted by a member selected from hydrogen, alkyl with 1 to 8 carbon atoms and aryl with 3 to 7 carbon atoms, wherein the heterocyclic compound includes 1 to 2 nitrogen atoms and 0 to 1 oxygen atom, and the nitrogen atoms are not directly connected to each other or connected to the oxygen atom.

In this training sample, in addition to the labels expressed above, a composition relationship may also be labeled. For example, the composition relationship between R1, R2 and the heterocycle may be labeled as Constituent_Of according to the above description 'R1 and R2 may be combined to form a 5 to 7-membered heterocycle'.

Example 6: R' is C3-12 alkylene, and the chain may be interrupted by one or more heteroatoms, such as O, S, NRN2 (wherein RN2 is hydrogen or C1-4 alkyl), and/or aromatic ring, such as benzene or pyridine.

In this training sample, in addition to the labels expressed above, an interruption relation may also be labeled. For example, the chain is interrupted by one or more heteroatoms, which may be labeled as Interrupted according to the above description 'the chain may be Interrupted by one or more heteroatoms.

Example 7: When R and R1 are both hydrogen or methyl and Y is hydrogen, neither X nor Z is chlorine.

In this training sample, in addition to the labels described above, as can be seen from the conditional relationship such as the above description, only when R and R1 are valued, the values of X and Z can be obtained. At this time, the label may be Condition for R and R1, X and Z according to the conditional relationship. Similarly, 'when', 'if', etc. appearing in the description may be labeled in the above way. In addition, the label may be Exclusive in case of an exclusive value. For example, the values of X and Z are not chlorine, which may be labeled as Exclusive according to the above description 'neither X nor Z is chlorine'.

Before training with the above samples, in some embodiments, definitions of entity types and entity relationships may be created. The entity types of natural language processing tasks are: 1. branch structure mark; 2. branch structure enumeration; 3. branch structure name; 4. branch structure reference name; 5. branch structure category; 6. branch structure bracket; 7. branch structure position skeleton; 8. description of branch structure position skeleton. Table 1 shows the entity relationship definitions and example references in annotations.

TABLE 1

Entity Relationship Definitions and Example References in Annotations

| Relationship | Entity 1 | Entity 2 | Annotation |
| --- | --- | --- | --- |
| Value_Replacement | A value of a branch structure mark can be replaced by entity 2. | Branch structure enumeration: mostly are names of branch structures, and may also be branch structure marks. | The most common relationship, and some phrase patterns for example are: selected from the group consisting of, represent, indicate, substitute, representative, include, mean, wherein, etc. As illustrated in Example 2. |
| Attribute | Branch structure enumeration; entity 2 is a feature of entity 1. | Branch structure enumeration | Entity 2 is a feature of entity 1. Phase patterns: include, have. Note: when there is a cycle due to an attribute and some relationships, the attribute needs to be deleted. As illustrated in Example 3. |
| Part_Of | The branch structure enumeration is part of the name of entity 2 or equivalent to entity 2. | Mostly are branch structure enumerations and there must be a particular name. | This relationship aims to create a connection between some entities and all entities. If there is a connection, some values in some entities will be replaced. Note: entity 1 may be a branch structure mark, and entity 2 may be a branch structure enumeration including a name of the branch structure mark. For example, R1b is entity 1 and -C(O)R1b is entity 2. As illustrated in Example 1. |
| Reference | The branch structure enumeration is a reference name; entity 2 is mostly a name of a set. | Mostly are branch structure enumerations and there must be a specific name. | This relationship will show what a reference name refers to. For example, entity 1 may be: residue, substituent, acid. Difference: entity 1 in Part_Of is a special name, while entity 1 in Reference is an unspecific name. As illustrated in Example 4. |
| Constituent_Of | Branch structure enumeration, which consists of other entities. | The branch structure enumeration and other Markush enumerations together constitute entity 1. | Note: entity 1 is a data source and entity 2 is a target implementation. As illustrated in Example 5. |
| Position | Branch structure enumeration and branch structure mark, which have positions in entity 2. | Branch structure enumeration, in some cases, this entity is related to the entity in Part_Of. | Through the following phrases, a relationship therebetween can be easily found: combined with . . . , in . . . , at . . . , belong to . . . , etc. As illustrated in Example 5. |
| Interrupted | The branch structure enumeration is interrupted by entity 2 | Mostly are branch structure enumerations. | As illustrated in Example 6. |
| Quantifier | Mostly are Markush branch structures. | Quantity; mostly not more than 1, 1 to 3. 1 or more, etc. | This relationship means that entity 2 has a numeric phrase and the sequence must be from quantity to entity. As illustrated in Example 1. |
| Exclusive | The branch structure mark and a value of the branch structure enumeration cannot be replaced by entity 2 | Branch structure mark or branch structure enumeration | This relationship is not a substitution value, for example, no, no substitution. As illustrated in Example 7. |
| Condition | Branch structure mark; the branch structure enumeration indicates that entity 2 only gets a value after entity 1 is valued. | Branch structure mark, branch structure enumeration | The sequence must be from entity 1 to entity 2, for example, when, if, etc. As illustrated in Example 7. |

In some embodiments, with the natural language model, it is possible to recognize the meanings represented by different phrases in the target text information and association relationships between a plurality of phrases, determine corresponding image elements based on the meanings represented by different phrases, and determine a direct combination or connection relationship of the image elements according to the association relationships between the plurality of phrases, so as to generate a corresponding target image. Alternatively, a target image may be drawn through a drawing program based on the meanings represented by different phrases in the target text information and the association relationships between the plurality of phrases.

S230: storing the target image to form an image database.

In some embodiments, for a target image including a main structure and a branch structure, the main structure and the branch structure may be stored in correspondence. Specifically, the main structure usually corresponds to the branch structure on a one-to-one or one-to-many basis. For example, one main structure corresponds to one branch structure or a plurality of branch structures. The main structure and the branch structure may be stored in different entity tables according to the corresponding relationship. For example, Entity Table 1 records information of a serial number of a branch structure corresponding to a main structure A, and Entity Table 2 records image information of the branch structure. If a user needs to obtain information of the branch structure corresponding to the main structure, the main structure may be taken as a query field. In some embodiments, an association array may be formed and stored based on the corresponding relationship between the main structure and the branch structure.

In some embodiments, storing the target image to form the image database may further comprise storing the target file in association with the target image. Specifically, the target image usually corresponds to the target file on a one-to-one or one-to-many basis, i.e., one target file may include only one target image or a plurality of target images. Therefore, the target file and the target image may be stored in association according to the corresponding relationship. For example, the target file and the target image may be stored in different entity tables, or an association array may be formed and stored according to the corresponding relationship between the target file and the target image.

Further, in some embodiments, the target text information in the target file and the corresponding target image may also be stored in association, wherein the association storage may be performed in the above-mentioned manner or any other manner.

In this embodiment of the present disclosure, target text information in a target file may be obtained, and a target image may be generated based on the target text information, then the target image may be stored to form an image database. Further, if the target file includes image information, the target image may be generated based on an association between content expressed by the target text information and the image information, and then the target image may be stored to form an image database. The process of forming the image database in this embodiment of the present disclosure may be executed by a computer, without manually filtering, analyzing or summarizing the text files, thereby effectively improving the efficiency of establishing the image database.

Figure 5:
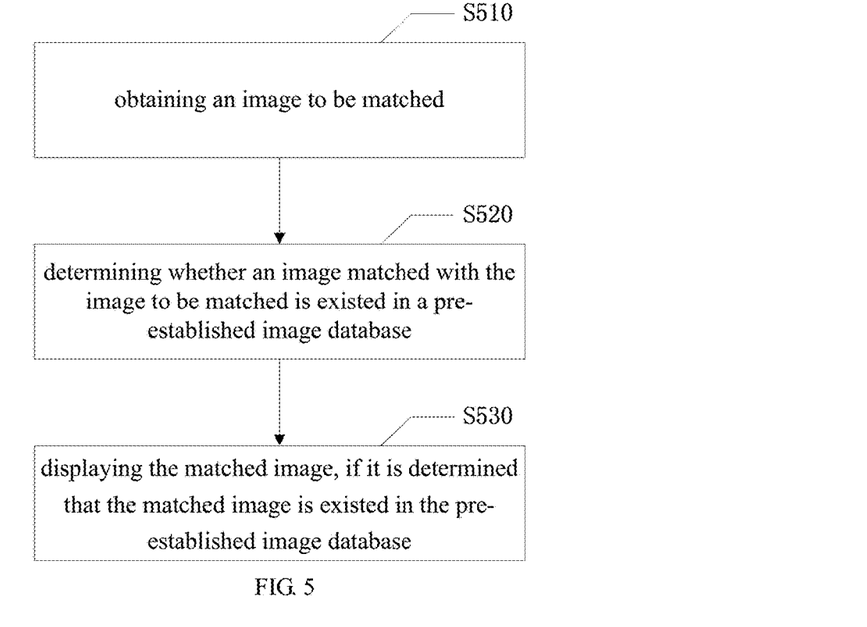
FIG. 5 is a flowchart of a searching method according to an embodiment of the present disclosure.

The embodiments of the present disclosure further provide a searching method, as illustrated in FIG. 5, comprising the following steps.

S510: obtaining an image to be matched.

In some embodiments, the image to be matched may comprise a main structure and at least one branch structure associated with the main structure, or may only comprise a main structure or any specific structure. The image to be matched may also be a chemical structural formula.

Figure 6:
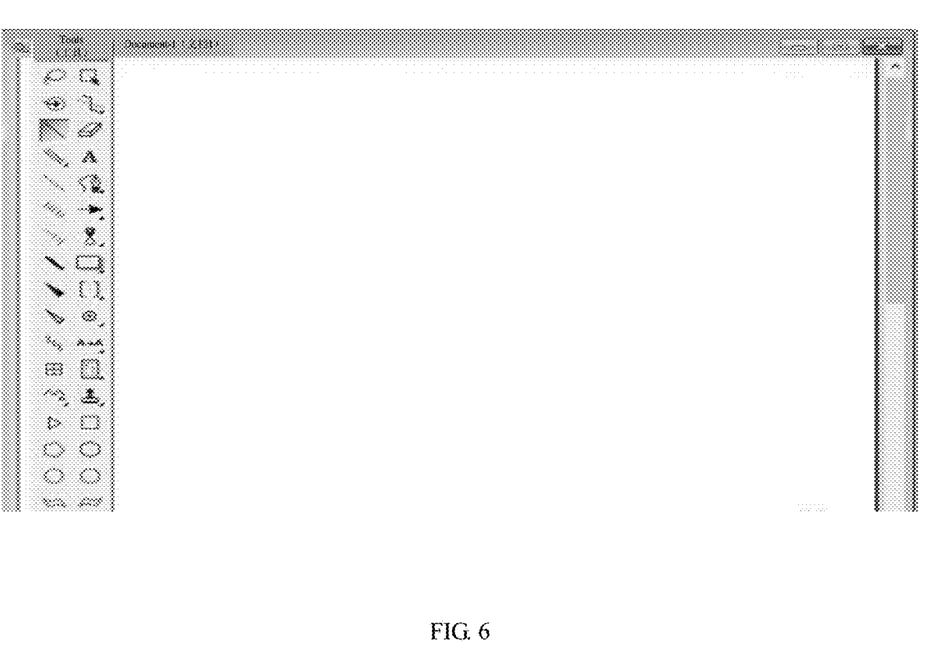
FIG. 6 is a schematic diagram of a user input interface according to an embodiment of the present disclosure.

The way to obtain the image to be matched may be that a user manually inputs the image to be matched, or the image to be matched may be obtained in any other way. As illustrated in FIG. 6, a user may draw an image to be matched in a blank part of FIG. 6, and a server may obtain the image to be matched after the user finishes drawing.

S520: determining whether an image matched with the image to be matched is existed in a pre-established image database, wherein the pre-established image database is established by extracting text information and image information from a sample file, and based on images generated in accordance with the text information and the image information.

The matching method may perform matching by calculating a similarity, or normalizing cross-correlation matching, or by using an image matching method based on a transform domain. In this embodiment, any other image matching method can also realize image matching.

S530: displaying the matched image, if it is determined that the matched image is existed in the pre-established image database.

Figure 7:
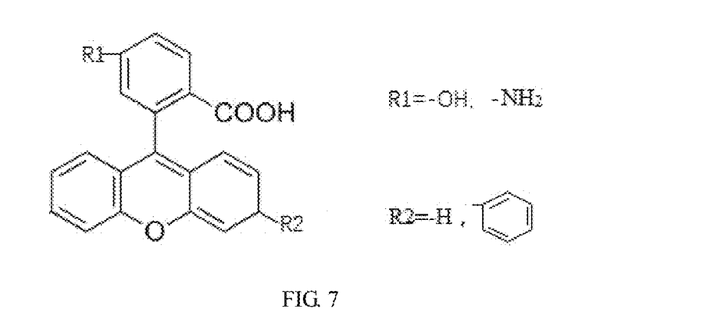
FIG. 7 is a schematic diagram of displaying of search results according to an embodiment of the present disclosure.
Figure 8:
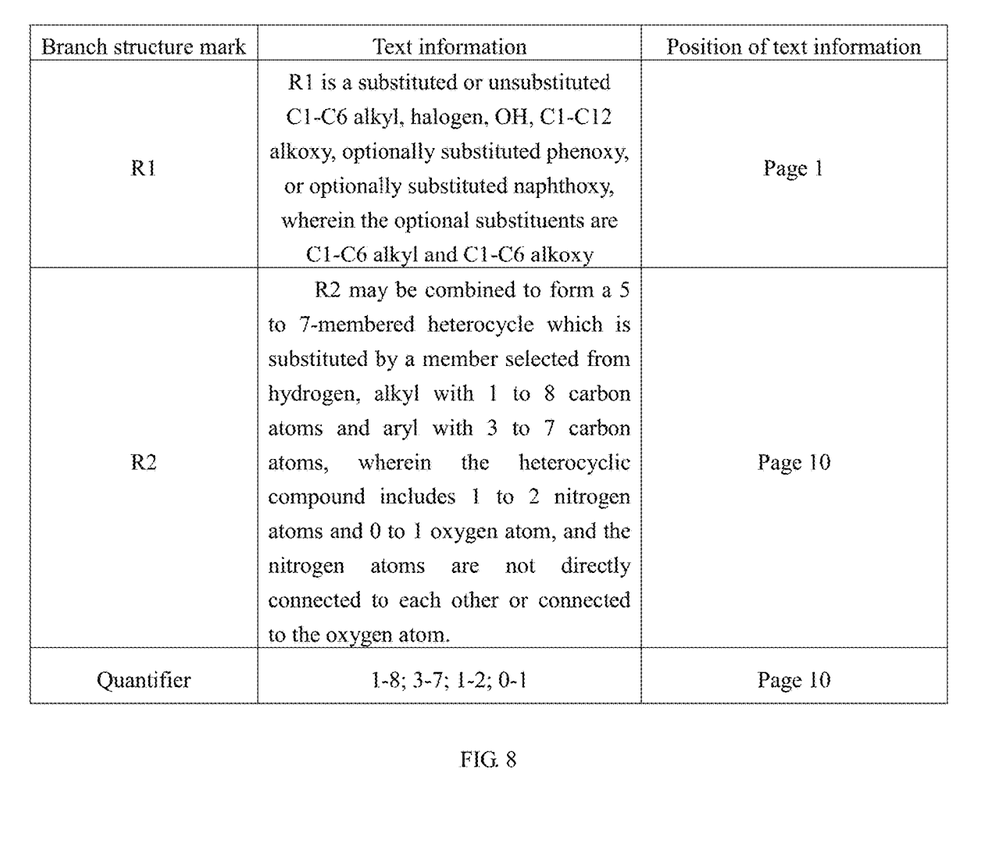
FIG. 8 is another schematic diagram of displaying of search results according to an embodiment of the present disclosure.

In some embodiments, if the pre-established image database includes an image matched with the image to be matched, the matched image will be displayed in a preset display mode according to a user's view trigger operation, such as clicking a search button or a view button, as illustrated in FIG. 7. In some embodiments, in addition to displaying the image, text information associated with the image may also be displayed, or only the text information associated with the image may be displayed. The display mode of the text information may comprise highlighting, bolding, circling, etc., as illustrated in FIG. 8.

The embodiments of the present disclosure provide a searching method, which matches the image to be matched with images in a pre-established image database, and if the matching is successful, the matching result is displayed to the user, thereby helping the user to quickly search for the required image.

The embodiments of the present disclosure further provide a computer-readable storage medium based on the above image database establishing method, wherein the computer-readable storage medium stores computer program instructions executed to: obtain a target file which has target text information; generate a target image corresponding to content expressed by the target text information based on the target text information; and store the target image to form an image database.

In this embodiment, the storage medium comprises, but is not limited to, Random Access Memory (RAM), Read-Only Memory (ROM), Cache, Hard Disk Drive (HDD) or Memory Card. The memory may be configured to store computer program instructions. In this embodiment, the specific functions and effects of the program instructions stored in the computer-readable storage medium may be explained with reference to other embodiments, which will not be repeated here.

Figure 9:
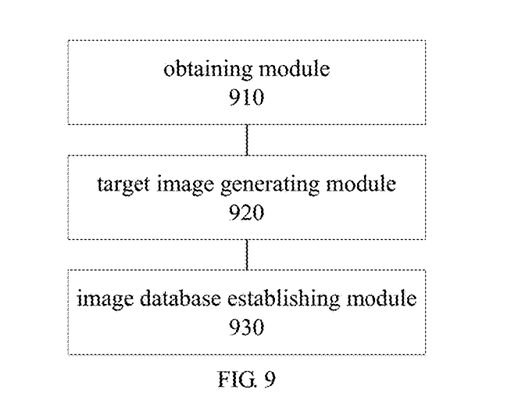
FIG. 9 is a functional block diagram of an image database establishing device according to an embodiment of the present disclosure.

Referring to FIG. 9, at a software level, the embodiments of the present disclosure further provide an image database establishing device, which may specifically comprise the following structural modules:

an obtaining module 910 configured to obtain a target file which has target text information;

a target image generating module 920 configured to generate a target image corresponding to content expressed by the target text information based on the target text information;

an image database establishing module 930 configured to store the target image to form an image database.

In some embodiments, the target image generating module 920 may comprise:

a first generating unit configured to generate a target image corresponding to content expressed by the target text information, when a chemical structure expressed by the target text information does not comprise a Markush structure, wherein the target image includes a chemical structure formula of the chemical structure;

a second generating unit configured to determine, when the target file comprises an image file and a corresponding text file, an image in the image file corresponding to the target text information of the text file; and take the image corresponding to the target text information as the target image;

a third generating unit configured to determine, when the target text information comprises main information expressing a main structure of the chemical structure, the main structure comprised in the target image based on the main information in the target text information; and add, when the target text information comprises branch information expressing a branch structure of the chemical structure, a branch structure to the main structure of the target image based on the branch information in the target text information;

a fourth generating unit configured to perform, when the target file is a picture file, an image recognition on the picture file to determine the target text information in the picture file; and generate a target image corresponding to the target text information based on the target text information; wherein the target image comprises a chemical structural formula of the chemical structure expressed by the target text information;

a fifth generating unit configured to determine, when the target file comprises image information and text information, target text information in the text information, wherein the target text information expresses a chemical structure; determine whether images comprised in the image information comprise the target image corresponding to the target text information, wherein the target image comprises a chemical structural formula of the chemical structure expressed by the target text information; and accordingly, generate a target image expressed by the target text information based on the target text information, when there is no target image corresponding to the target text information in the images comprised in the image information.

Figure 10:
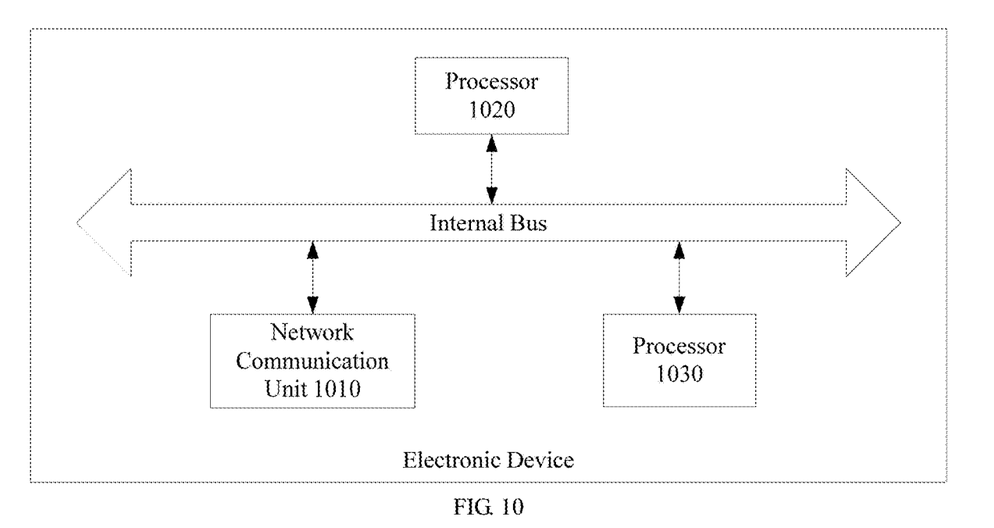
FIG. 10 is an architectural diagram of an electronic device according to an embodiment of the present disclosure.

Referring to FIG. 10, at a hardware level, the embodiments of the present disclosure further provide an electronic device, which specifically may comprise a network communication unit 1010, a processor 1020 and a memory 1030. The network unit 1010 and the memory 1030 are electrically connected to the processor 1020.

Wherein, the network communication unit 1010 is configured to obtain a target file which has target text information;

the processor 1020 is configured to generate a target image corresponding to content expressed by the target text information based on the target text information;

the memory 1030 is configured to store the target image into an image database.

The network communication unit is configured for information transmission, and may transmit a command or status information from one end to the other end through a channel. The information transmission mode may comprise a wired transmission and a wireless transmission, wherein the wired transmission mode may perform a network information transmission through a telephone line or a special cable, and the wireless transmission mode may perform a network information transmission through a radio station, a wireless network, etc.

The processor may be a Central Processing Unit (CPU), any other general-purpose processor, a Digital Signal Processor (DSP), an Application Specific Integrated Circuit (ASIC), a Field-Programmable Gate Array (FPGA) or any other programmable logic device, a discrete gate or a transistor logic device, a discrete hardware component, etc. The general-purpose processor may be a microprocessor, any conventional processor or the like.

The memory may be configured to store the computer program and/or module, and the processor may realize various functions for establishment of an image database, by running or executing the computer program and/or module stored in the memory and calling data stored in the memory. The memory may mainly comprise a program storage area and a data storage area, wherein the program storage area may store an operating system, an application program required by at least one function (e.g., a sound playing function, a text conversion function, etc.), and the like. The data storage area may store data (e.g., audio data, text message data, etc.) created according to a use of a user terminal. In addition, the memory may comprise a high-speed random-access memory, and may further comprise a non-volatile memory, such as a hard disk, a memory bank, a plug-in hard disk, a Smart Media Card (SMC), a Secure Digital (SD) card, a Flash Card, at least one magnetic disk memory device, a flash memory device or any other volatile solid-state memory device.

In some embodiments, the memory may store an image database, and may store the generated target image in the image database.

In some embodiments, the memory does not store any image database, and may store the generated target image to form an image database.

Figure 11:
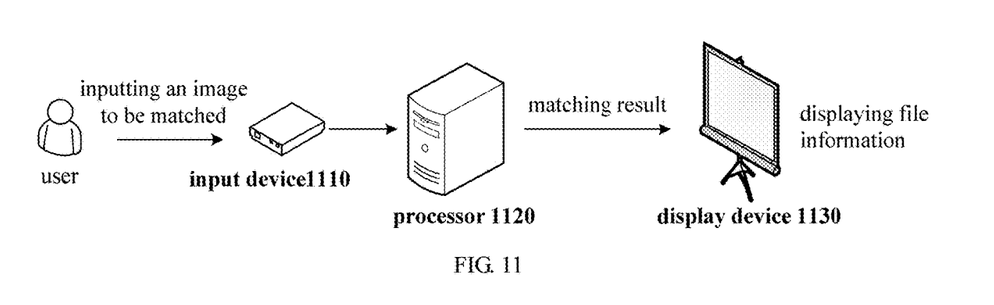
FIG. 11 is an architectural diagram of an electronic device according to an embodiment of the present disclosure.

The embodiments of the present disclosure further provide an electronic device, as illustrated in FIG. 11, which may comprise: an input device 1110 configured to obtain an image to be matched (as illustrated in FIG. 6); a processor 1120 configured to determine whether an image matched with the image to be matched is existed in a pre-established image database; wherein the pre-established image database is established by extracting text information and image information from a sample file and based on images generated in accordance with the text information and the image information; and a display device 1130 configured to display the matched image if it is determined that the matched image is existed in the pre-established image database.

The input device is a device for inputting data and information, and a bridge for communications between the device and users or other devices. The input devices may comprise, but is not limited to, a keyboard, a mouse, a camera, a scanner, a light pen, a tablet input panel, a joystick, a voice input device and the like.

The processor may be a Central Processing Unit (CPU), any other general-purpose processor, a Digital Signal Processor (DSP), an Application Specific Integrated Circuit (ASIC), a Field-Programmable Gate Array (FPGA) or any other programmable logic device, a discrete gate or a transistor logic device, a discrete hardware component, etc. The general-purpose processor may be a microprocessor, any conventional processor or the like.

The display device is a device capable of outputting an image or tactile information (e.g., a Braille display designed for the blind), and may include, but not limited to, a display, a display screen, a screen, a projector, etc.

If the pre-established image database includes an image matched with the image to be matched, the display device may display the matched image in a preset display mode according to a user's view trigger operation, such as clicking a search button or a view button, as illustrated in FIG. 7. In some embodiments, in addition to displaying the image, text information associated with the image may also be displayed, or only the text information associated with the image may be displayed. The display mode of the text information may comprise highlighting, bolding, circling, etc., as illustrated in FIG. 8.

The embodiments of the present disclosure further provide a computer-readable storage medium based on the above image database establishing method, wherein the computer-readable storage medium stores computer program instructions executed to: obtain an image to be matched; determine whether an image matched with the image to be matched is existed in a pre-established image database, wherein the pre-established image database is established by extracting text information and image information from a sample file and based on images generated in accordance with the text information and the image information; and display the matched image, if it is determined that the matched image is existed in the pre-established image database.

In this embodiment, the storage medium may comprise, but is not limited to, a Random-Access Memory (RAM), a Read-Only Memory (ROM), a Cache, a Hard Disk Drive (HDD) or a Memory Card. The memory may be configured to store computer program instructions.

In this embodiment, the specific functions and effects of the program instructions stored in the computer-readable storage medium may be explained with reference to other embodiments, which will not be repeated here. As can be seen from the above description, the method provided by the embodiments of the present disclosure may match the image to be matched with images in a pre-established image database, and if the matching is successful, display a matching result to a user, thereby helping the user to quickly search for the required image.

In the 1990s, an improvement to a technology could be clearly distinguished as a hardware improvement (e.g., an improvement to a circuit structure such as diode, transistor, switch, etc.) or a software improvement (an improvement to a methodical flow). However, with the development of the technology, the improvements to many methodical flows nowadays can be deemed as direct improvements to the hardware circuit structure. The designers almost always obtain the corresponding hardware circuit structure by programming the improved methodical flows into the hardware circuit. Thus, it cannot be said that an improvement to a methodical flow cannot be implemented by a hardware entity module. For example, a Programmable Logic Device (PLD) (such as a Field Programmable Gate Array (FPGA)) is such an integrated circuit whose logic function is determined by the user's programming of the device. The designers themselves program to "integrate" a digital system to a single PLD, without requiring any chip manufacturer to design and manufacture the dedicated integrated circuit chips. Moreover, today, instead of manually making the integrated circuit chips, the programming is mostly implemented using the software "logic compiler". It is similar to the software compiler used in program development and drafting, and the previous original codes also need to be compiled in a specific programming language, which is referred to as the Hardware Description Language (HDL). In addition, there are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, the Very-High-Speed Integrated Circuit Hardware Description Language (VHDL) and Verilog are most commonly used. It is also be apparent to those skilled in the art the hardware circuit for implementing the logic methodical flows can be easily obtained by slightly programming the methodical flows into the integrated circuit with the above hardware description languages.

Specifically, any system, module or unit set forth in the above embodiments may be implemented by a computer chip or an entity, or by a product having a certain function. A typical implementation device is a computer. To be specific, the computer may be, for example, a personal computer, a laptop computer, a cellular phone, a camera phone, a smart phone, a personal digital assistant, a media player, a navigation device, an email device, a game console, a tablet computer, a wearable device, or combination of any of these devices.

From the above description of the embodiments, it is clear to persons skilled in the art that the present disclosure may be implemented by means of software plus necessary general hardware platform. Based on this understanding, the technical solution of the present disclosure essentially or a part thereof that makes a contribution to the prior art, may be embodied in the form of a computer software product, which may be stored in a storage medium such as an ROM/RAM, a magnetic disk, an optical disk, etc., including several instructions to cause a computer device (e.g., a personal computer, a server, or a network device, etc.) to perform the methods described in various embodiments or some parts thereof in the present disclosure.

The various embodiments in the disclosure are described in a progressive manner, and the same or similar parts between the various embodiments may be referred to each other, and each embodiment focuses on the differences from the other embodiments. In particular, the system embodiment is simply described since it is substantially similar to the method embodiment, and please refer to the description of the method embodiment for the relevant content.

The present disclosure may be used in many general or dedicated computer system environments or configurations, such as a personal computer, a server computer, a handheld device or a portable device, a tablet device, a multiprocessor system, a microprocessor-based system, a set-top box, a programmable consumption electronic device, a network PC, a minicomputer, a mainframe computer, a distributed computing environments including any of the above systems or devices, and the like.

The present disclosure may be described in the general context of computer executable instructions executed by the computer, e.g., the program module. In general, the program module includes a routine, a program, an object, a component, a data structure, etc. executing a particular task or realizing a particular abstract data type. The present disclosure may also be put into practice in the distributed computing environments where tasks are executed by remote processing devices connected through a communication network. In the distributed computing environments, the program modules may be located in the local and remote computer storage medium including the storage device.

Although the present disclosure is depicted through the embodiments, persons of ordinary skill in the art will appreciate that there are many variations and modifications to the present disclosure without departing from the spirit of the present disclosure, and it is intended that the appended claims include these variations and modifications without departing from the spirit of the present disclosure.

The invention claimed is:
1. An image database establishing method, comprising:
obtaining a target file which has target text information;

generating a target image corresponding to content expressed by the target text information based on the target text information, wherein the target text information comprises main information expressing a main structure of a chemical structure, and branch information expressing a branch structure of the chemical structure; and storing the target image to form an image database, wherein the generating a target image corresponding to content expressed by the target text information based on the target text information comprises:

determining a main structure comprised in the target image based on the main information in the target text information; and adding a branch structure to the main structure of the target image based on the branch information in the target text information.

2. The method according to claim 1, wherein obtaining the target file comprises:

downloading files from a data source to form a file set; and obtaining a target file from the file set according to a preset condition.

3. The method according to claim 2, wherein the preset condition comprises:

determining a file type of the files in the file set;

determining a filtering rule of a corresponding target file in accordance with the file type, wherein different file types correspond to different filtering rules, and wherein the filtering rule is adopted to filter files of a corresponding file type to obtain a target file.

4. The method according to claim 3, wherein determining the file type of the files in the file set comprises:

performing a text recognition on the files in the file set to obtain text information included in the files; and determining the file type of the files in the file set based on a preset keyword included in the text information.

5. The method according to claim 1, further comprising performing a text recognition on the target file to obtain the target text information.

6. The method according to claim 1, wherein the target text information expresses a chemical structure, and the corresponding target image comprises a chemical structure formula corresponding to the content expressed by the target text information.

7. The method according to claim 1, wherein the target image corresponding to the content expressed by the target text information comprises a main structure and at least one branch structure associated with the main structure.

8. The method according to claim 7, wherein the main structure comprises a main part of a Markush structure, and the branch structure comprises a substituent part of the Markush structure.

9. The method according to claim 1, wherein generating the target image corresponding to content expressed by the target text information based on the target text information comprises one of:

generating, if a chemical structure expressed by the target text information does not comprise a Markush structure, the target image corresponding to the content expressed by the target text information, wherein the target image comprises a chemical structural formula of the chemical structure;

determining, if the target file comprises an image file and a corresponding text file, an image in the image file corresponding to the target text information of the text file, and taking the image corresponding to the target text information as the target image.

10. The method according to claim 1, wherein storing the target image to form the image database comprises:

storing the main structure and the branch structure of the target image in correspondence.

11. The method according to claim 1, wherein the target file is a picture file; and generating the target image corresponding to content expressed by the target text information based on the target text information comprises:

performing an image recognition on the picture file to determine the target text information in the picture file; and generating the target image corresponding to the target text information based on the target text information, wherein the target image comprises a chemical structural formula of a chemical structure expressed by the target text information.

12. The method according to claim 1, wherein the target file comprises image information and text information; the method further comprises:

determining target text information in the text information, wherein the target text information expresses a chemical structure;

determining whether images comprised in the image information comprise the target image corresponding to the target text information, wherein the target image comprises a chemical structural formula of the chemical structure expressed by the target text information; and generating the target image expressed by the target text information based on the target text information, if there is no target image corresponding to the target text information in the images comprised in the image information.

13. The method according to claim 1, wherein storing the target image to form an image database further comprises: storing the target file and the target image in association.

* * * * *